United States Patent [19]

Blankenship et al.

[11] Patent Number: 5,338,916
[45] Date of Patent: Aug. 16, 1994

[54] CONTROL CIRCUIT FOR ALTERNATING CURRENT TIG WELDER

[75] Inventors: George D. Blankenship, Chardon; Michael D. Hoffa, Euclid; Gary A. Mikitin, Mayfield Hts., all of Ohio

[73] Assignee: The Lincoln Electric Company, Cleveland, Ohio

[21] Appl. No.: 53,090

[22] Filed: Apr. 26, 1993

[51] Int. Cl.$^5$ .............................................. B23K 9/073
[52] U.S. Cl. .................. 219/130.4; 219/130.5
[58] Field of Search ............ 219/130.4, 130.51, 130.5, 219/137 PS, 130.1

[56] References Cited

U.S. PATENT DOCUMENTS

| Re. 31,486 | 1/1984 | Helmuth | 315/205 |
|---|---|---|---|
| 3,068,352 | 12/1962 | Correy | 219/137 |
| 4,038,515 | 7/1977 | Risberg | 219/131 |
| 4,371,776 | 2/1983 | Winn | 219/130 |
| 4,459,460 | 7/1984 | Ogilvie et al. | 219/130.51 |
| 4,764,857 | 8/1988 | Konopka | 363/49 |
| 4,767,912 | 8/1988 | Eldridge | 219/130.4 |

FOREIGN PATENT DOCUMENTS 3-180276  8/1991  Japan ................... 219/130.4

Primary Examiner—Clifford C. Shaw
Attorney, Agent, or Firm—Vickers Daniels & Young

[57] ABSTRACT

An improvement in an A.C. TIG welder for passing a current across an arc gap between a workpiece and a non-consumable electrode alternating between a first direction of arc current flow with the electrode negative and a second direction of arc current flow with the electrode positive. This type of welder comprises a transformer with a load voltage creating secondary winding in series with the arc gap and with a squaring circuit. The improvement involves a current control circuit connected in parallel with the arc gap wherein the control circuit has an energy storing capacitor, charging means for allowing the capacitor to charge rapidly according to the voltage across the arc gap tending to cause current flow across the gap in the second direction and a discharge means for controlling discharge of the capacitor across the gap in the second direction when the arc is created across the arc gap for current flow in the second direction.

23 Claims, 2 Drawing Sheets

CONTROL CIRCUIT FOR ALTERNATING CURRENT TIG WELDER

The present invention relates to arc welding and more particularly to a control circuit for an A.C. TIG welder of the type having an output welding current alternating between a first polarity defining a clean current portion and a second polarity defining a weld current portion.

INCORPORATION BY REFERENCE

The present invention relates to a control circuit for stabilizing the arc and for reducing freewheeling in an A.C. TIG welder of the type having a generally square wave current output at least above a threshold output current level. Such square wave A.C. TIG welders are well known in the field and are described in various prior patents. As background information, and to preclude the necessity for explaining well known technology in this application, various selected prior patents are incorporated by reference herein.

Correy U.S. Pat. No. 3,068,352 is an early patent teaching the concept of a square wave A.C. output current for TIG welding wherein the clean portion of the alternating current cycle, indicated to be the positive polarity, is controlled to have a time duration only as long as necessary for effecting the cleaning of the workpiece being welded by the TIG welding process. This process is used for TIG welding of aluminum in the A.C. mode. Correy provides square wave A.C. output current by switching a constant D.C. current from a rectifier between a positive polarity and a negative polarity through the use of switching devices, such as SCRs. In this manner, the square wave output is switched between a positive polarity clean current portion and a negative polarity weld current portion. TIG welding of aluminum by a method that can adjust the duration of the clean cycle and/or the weld cycle in an alternating current mode of operation by use of an inverter power supply is taught by this Correy patent.

Risberg U.S. Pat. No. 4,038,515 is incorporated herein by reference as illustrating a full bridge employing SCRs to convert a single phase input voltage into a square wave A.C. welding current wherein the time duration of the clean portion of the total cycle can be adjusted by changing the firing points or gating times or phases of the SCRs. These SCRs form two separate current paths through a common current stabilizing choke. The clean portion and weld portion in this prior patent, when operated in a square wave mode above a given current, are summed together to equal 360 electrical degrees. Consequently, the power supply illustrated in Risberg U.S. Pat. No. 4,038,515 is not as precisely adjustable as the Correy power supply, but the welder does produce a generally square wave current output above a certain current level. The welder has a clean current portion that is adjustable by selective firing of the SCRs controlling opposite polarity current paths.

Winn U.S. Pat. No. 4,371,776 discloses a square wave A.C. TIG welder employing forced commutating SCRs in a power circuit of the type including two SCRs or a four SCR bridge, as shown in Risberg U.S. Pat. No. 4,038,515. Winn and Risberg teach technology which allows adjustment of the clean portion of the total welding cycle in A.C. TIG welding of aluminum.

The several patents incorporated by reference herein show that the actual power circuit for a square wave A.C. TIG welder can take a variety of forms while still allowing adjustment of the clean cycle portion. The basic power circuit can be an inverter or a controlled bridge, as shown in Winn and Risberg '515. Details of the operation of these power circuits need not be repeated for an understanding of the present invention. The invention is applicable to a variety of known power circuits capable of producing A.C. welding current for TIG welding of aluminum and having the further capability of adjusting the clean cycle duration by selecting the instant that the arc current reverses polarity. The preferred embodiment uses the bridge as shown in Risberg and Winn.

BACKGROUND OF INVENTION

Tungsten inert gas welding of aluminum, aluminum alloys and similar metal is well known and a number of square wave welders have been developed for A.C. welding of such materials. When A.C. welding of aluminum, there is some difficulty caused by the fact that the electrode and metal workpiece have different abilities to emit electrons. The electrode emits electrons more readily than the metal workpiece, especially for aluminum, aluminum alloys and similar metals. Thus, during the A.C. current half cycle wherein the welding arc is maintained by current flow from the electrode (electrode negative) to the workpiece (referred to in the art as the straight polarity or weld half cycle) there is little resistance caused by the characteristics of the electrode or the workpiece to the formation or maintenance of the arc. In contrast, during the A.C. current half cycle wherein the welding arc is maintained by electron flow from the workpiece to the electrode (referred to in the art as the reverse polarity or clean half cycle) the tendency of the workpiece, particularly aluminum or aluminum alloys, to emit electrons poorly frequently results in non-conduction or poor conduction of current during this half cycle. This phenomenon is referred to as arc rectification and results in somewhat reduced quality welds. Accordingly, the welding field has sought welding current supplies which will reliably and inexpensively solve the problem of arc rectification and provide a stabilized welding arc for TIG A.C. arc welding of aluminum, aluminum alloys and similar metals.

The use of current waveforms having square shapes has reduced the difficulties experienced in TIG welding of aluminum by increasing the rate of di/dt at zero crossings; however, establishing the arc during the transition between electrode negative and electrode positive has still been somewhat unstable. Consequently, it is not uncommon to provide square wave welders with high frequency pulses of current having a relatively high voltage at the time of arc current reversal caused by switching the square wave power supply from one current polarity to the other current polarity. The high frequency, high voltage pulses are induced into the welding lead by a high frequency transformer where the secondary of the transformer is part of the welding circuit. When the arc current is to be reversed in polarity, a high frequency pulse, usually controlled by a microprocessor or other control device, causes one or more high frequency pulses across the arc gap to assure the creation of an arc in the reverse current direction. This prior art solution for establishing the arc as the current is reversed sometimes fails to cause an arc upon switching from straight to reverse polarity and, thus, results in an unstable arc. Such use of a high frequency starting voltage to force conduction of electrons from the aluminum workpiece to the tungsten electrode upon switching of the welding current from straight to reverse polarity does improve the performance over prior art having no such high frequency control arrangement; however, arc rectification can still occur at the current reversals of the square wave A.C. TIG welder.

The problem of arc stability is quite prevalent in an A.C. TIG welder of the type shown in the Risberg and Winn patents. The present invention has been developed for the purpose of controlling arc stabilization by assuring the creation of an electric arc when switching from straight polarity to reverse polarity in an A.C. TIG welder of the type shown in Risberg and Winn. These two patents, which disclose power supplies to which the present invention is particularly directed, include SCR switching means for causing the reversal of welding current or arc current. This type of A.C. TIG welder power supply has a tendency to free wheel at current reversals because both SCR circuits are conducting at the same time and the energy stored within the squaring inductor freewheels through all the SCRs of the squaring circuit. Such freewheeling stops when the discontinued current path is rendered non-conductive by commutation of its SCR or pair of SCRs. In this type of power supply, not only is the arc unstable, even with high frequency starting, but also freewheeling at current reversal prevents a rapid conversion from one polarity to the other polarity.

These problems are solved by the present invention which is directed toward a control circuit of an A.C. TIG welder, especially of the type having a four SCR bridge with an intermediate D.C. choke for current squaring.

SUMMARY OF THE INVENTION

The present invention relates to an improvement in an A.C. TIG welder for passing a current across an arc gap between a workpiece and a non-consumable electrode alternately in a first direction of arc current flow with the electrode negative and a second direction of arc current flow with the electrode positive. This type of welder, to which the present invention is directed, comprises a transformer with a load voltage creating secondary winding in series with the arc gap and squaring circuit. The squaring circuit comprises a choke, a first SCR controlled switching circuit for passing current through the choke in a given flux creating direction when the arc current is passing through the arc gap in the first direction and a second SCR controlled switching circuit for passing current through the choke in the same given flux creating direction when the arc current is passing through the arc gap in the second direction, The term "flux creating direction" is to include the two SCR squaring circuit of Winn and the four SCR squaring circuit of Winn and Risberg. This type of squaring circuit includes control means for activating the first switching circuit at a first time when the load voltage is in a first polarity and a second switching circuit at a second time when the load voltage is in a second polarity. This general definition of the A.C. TIG welder in which the present invention is an improvement is well known in the art and the timing of the polarities, current directions and curent reversal points are well known technology. The reversal points can be controlled to produce an unsymmetrical A.C. square wave output. The current reversals must occur when there is voltage from the transformer secondary with the polarity that can cause current reversal. All of these technical aspects of a square wave A.C. TIG welder are well known in the art.

The present invention relates to an improvement of this type square wave welder wherein there is included a current control circuit connected in parallel with the arc gap. This current control circuit has a capacitor, charging means for allowing the capacitor to charge rapidly according to the voltage across the arc gap which is in a direction tending to cause current flow across the gap in the second direction, which has been defined as the direction from electrode negative to electrode positive. The control circuit also includes discharge means for controlling discharge of the capacitor across the arc gap in the same second direction when the arc is created across the arc gap by current flow in such second direction. In essence, the present invention is a parallel circuit placing a capacitor across the arc gap. At the current reversal from electrode negative to an electrode positive, the load voltage is in the positive half cycle. The electrode positive SCRs are switched on. This switching action tends to cause current flow in the second direction across the arc gap to switch between an electrode negative condition to an electrode positive condition. Until an arc is actually established across the gap, there is no current flow across the gap. Thus, current from the squaring circuit charges the capacitor connected in parallel with the gap. When the charged voltage of the capacitor is sufficient to be discharged across the gap, the arc across the gap is established. In accordance with the preferred embodiment of the invention, discharge of the capacitor across the gap is facilitated by a standard high frequency pulse created in the weld lead to the electrode. The high frequency, high voltage pulse causes discharge of the capacitor and establishment of an arc across the gap if the arc has not yet been established. By the combination of the parallel connected capacitor and discharging of the capacitor by the high frequency pulse, an arc is positively created at a specific time after the SCRs have been actuated to reverse the arc current across the gap. This circuit is used when the squaring circuit switches from straight to reverse polarity and is especially useful for aluminum, aluminum alloys and similar metals.

In accordance with another aspect of the present invention, the capacitor is discharged at a time delay after the current reversal has been called for by selective switching of the SCRs in the power circuit, i.e. squaring circuit. The delay is greater at lower currents and less at the higher currents. Arc current means the actual current across the arc for welding and in the sum of the negative and positive currents.

In accordance with another aspect of the present invention, there is a current control circuit in series with the capacitor with a diode and resistor connected in parallel. The diode is poled to allow rapid charging of the capacitor before the arc is created across the gap after a switching signal has been generated. When the arc is created and the capacitor discharges across the gap, the discharge current flows through the resistor. This differential circuit allows rapid charging and relatively controlled discharging of the capacitor. This parallel circuit constructed in accordance with the invention stabilizes the current and provides positive arc creation at the current reversal in a square wave TIG welder when the output current shifts from electrode negative to electrode positive. It has also been found that the capacitor across the gap reduces the freewheeling of the four diode bridge by force commutating the pair of SCRs which are conducting at the time the current is to be reversed from electrode negative to electrode positive.

The primary object of the present invention is the provision of a power supply for A.C. TIG welding of aluminum, aluminum alloys and similar metals which stabilizes the welding arc between the electrode and workpiece.

Yet another object of the present invention is the provision of an A.C. TIG welder, as defined above, which TIG welder achieves improved quality welds by self-stabilizing the welding arc between the electrode and workpiece.

Another object of the present invention is the provision of a somewhat inexpensive arc stabilizing circuit in parallel with the arc gap of an A.C. TIG welder using a standard squaring circuit which arc stabilizing circuit positively creates an arc when shifting from electrode negative to electrode positive and also reduces the amount of freewheeling at switching of the squaring circuit.

Yet a further object of the present invention is the provision of an A.C. TIG welder, as defined above, which TIG welder employs a capacitor that assists in the reignition of the arc upon current reversal from electrode negative to electrode positive position.

Another object of the present invention is the provision of an A.C. TIG welder, as defined above, which TIG welder employs a high frequency starting pulse which can be weaker than pulses normally employed.

These and other objects and advantages will become apparent from the following description taken together with the following drawings.

PREFERRED EMBODIMENT

Figure 1:
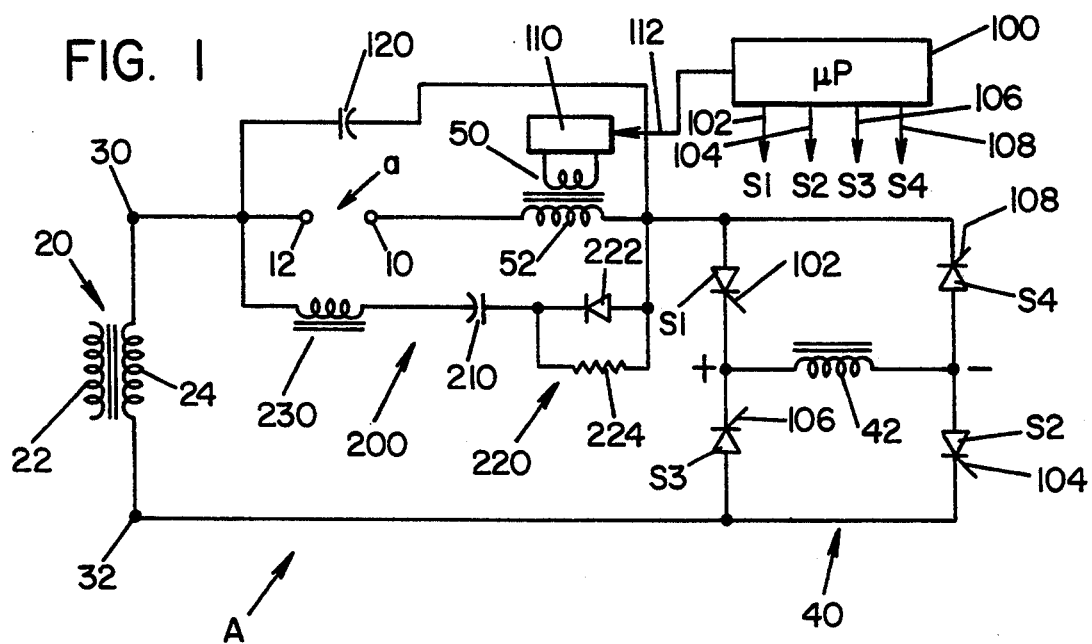
FIG. 1 is a wiring diagram illustrating a first embodiment of the present invention.

Referring now to the drawings wherein the showings are for the purpose of illustrating the preferred embodiments of the present invention and not for the purpose of limiting same, FIG. 1 shows an A.C. TIG welder A for passing an alternating current across arc gap a between a non-consumable electrode 10 normally formed of tungsten and a workpiece 12, for instance aluminum. Input transformer 20 includes a primary 22 and a secondary 24 for passing a load voltage across gap a from output terminals 30, 32. In accordance with somewhat standard practice, welder A includes a squaring circuit of bridge 40 having a relatively large squaring choke 42 and an SCR switching means for reversing the current across gap a. The squaring circuit can take at least two forms using two SCRs or four SCRs, as illustrated in the Winn patent. In the illustrated embodiment of the present invention, bridge 40 is employed with SCRs S1, S2 for causing current flow in the electrode negative direction when the electrode is negative and the workpiece is positive, normally referred to as the straight polarity. SCRs S3, S4 are conductive in unison to direct a reversed current across gap a in a direction referred to as electrode positive or reverse polarity. The SCRs are operated alternately to pass a current in one direction across gap a and then in an opposite direction. The switching must occur at non-zero points in the load voltage from secondary winding 24 and must occur when the polarity of the voltage is in the direction of the polarity of the intended current across the gap. As is well known, the exact positions in a time-based sense for the switching functions are selected and controlled to adjust the clean cycle or reverse polarity with respect to the straight polarity. It is common practice to provide a high frequency transformer 50 with the secondary 52 in the lead from the squaring circuit or bridge 40 to electrode 10. Especially when switching from electrode negative to electrode positive, it is often necessary to provide a high frequency pulse or pulses to assure current reversal. In accordance with still further standard practice, a control means, such as a microprocessor 100, provides timed firing signals in gates 102, 104, 106 and 108 for selectively reversing the polarity of current flow across gap a. The high frequency generator 110 creates pulses in transformer 50 upon signals in gate 112 from microprocessor 100.

As so far described, the operation of A.C. TIG welder A is in accordance with somewhat standard practice. The only difference is that some prior art patents contend that the high frequency pulse or continuous high frequency is not required for reversing the current flow across arc a. It has been found that such high frequency is normally required especially for reverse polarity across gap a. As is well known, welder A may have appropriate switching arrangements for converting it into a D.C. welder using choke 42 for current stabilization. In addition, the high frequency is bypassed through a small capacitor 120.

Figure 4:
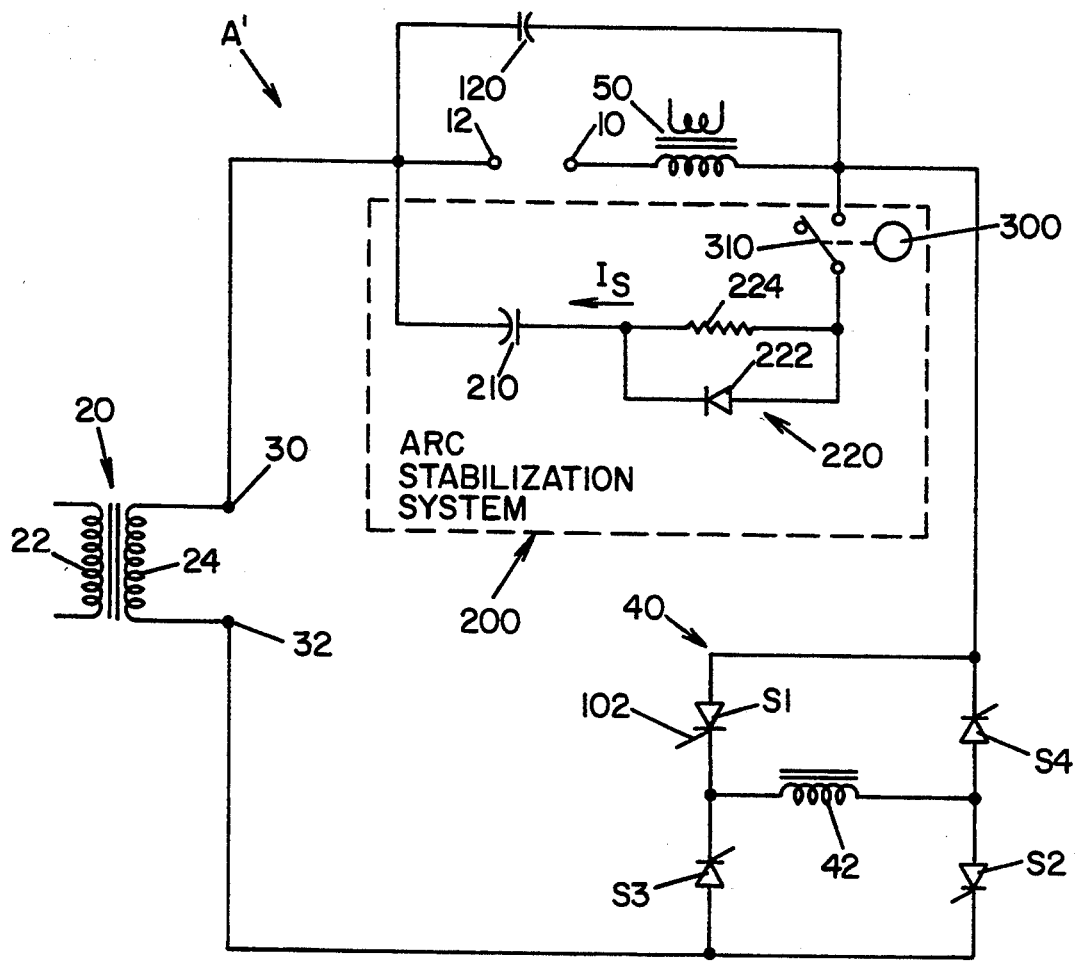

In accordance with the present invention, A.C. TIG welder A is provided with an arc stabilizing circuit 200 connected in parallel across gap a on the bridge side of transformer 50. Of course, the circuit could be connected on the electrode side of the high frequency transformer. A relatively large capacitor 210 is the primary component of circuit 200 and, as will be described later, provides a commutating function for bridge 40; however, the primary function of the capacitor is for the purpose of stabilizing the arc across gap a by assisting in the ignition of the arc when bridge 40 is changed from electrode negative to an electrode positive across gap a. Circuit 200 also includes a parallel charge/discharge circuit 220 including a diode 222 for controlling the charging of capacitor 210 and a parallel resistor 224 for controlling the rate of current flow during discharge of the capacitor 210 across gap a. In accordance with the illustrated embodiment, inductor 230 is provided. This inductor controls the rate of change of current flow across gap a and is employed in higher current rated welders, such as welders having approximately 350 rated output current capabilities. As shown in FIG. 4, inductor 230 is eliminated. This implementation of the present invention is for a welder having a rated output current of 255 amperes.

Figure 2:
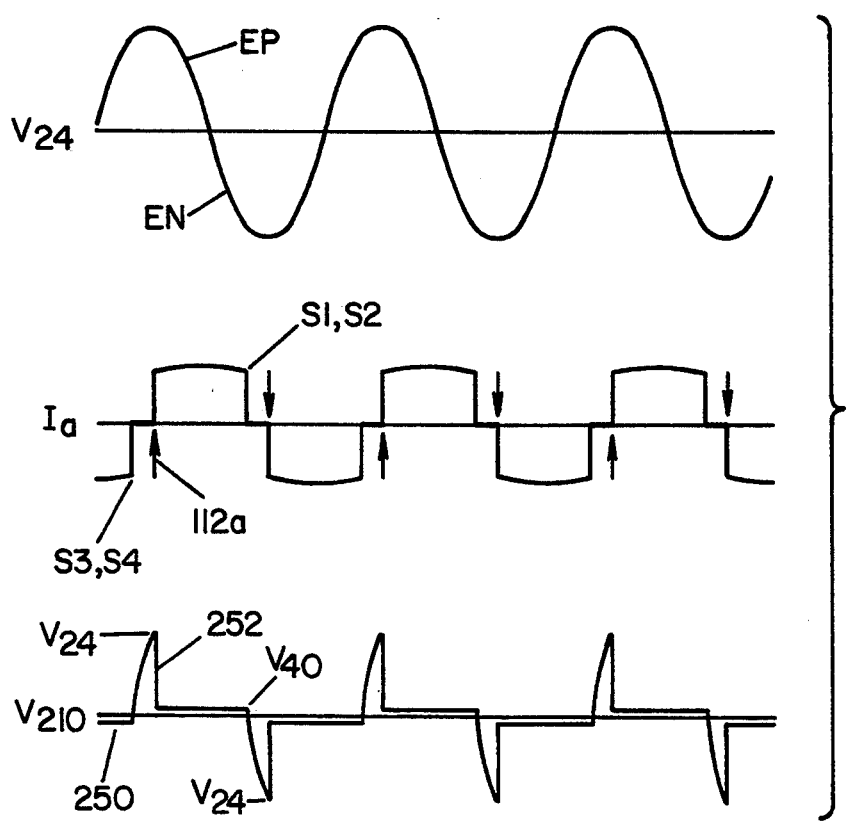
FIG. 2 is a series of graphs illustrating the waveforms employed in the embodiment of the invention shown in FIG. 1.
Figure 3:
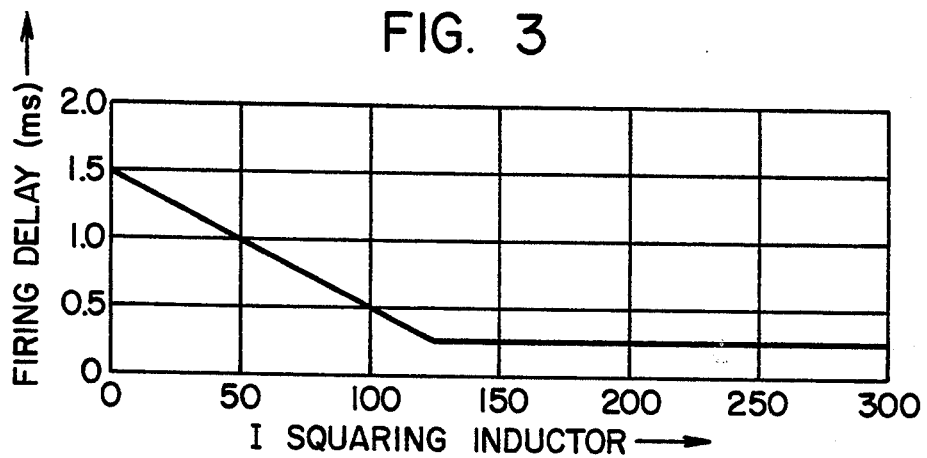
FIG. 3 is a graph showing an alternative aspect of the present invention wherein the high frequency firing time is delayed according to the welding current of the embodiment shown in FIG. 1; and, FIG. 4 is a wiring diagram illustrating the commercial embodiment of the present invention.

Referring now to FIG. 2, operation of auxiliary stabilizing circuit 200 is schematically illustrated with respect to the arc current $I_a$ with the voltage across capacitor 210 shown in the lower graph. Assuming that gap a has an arc current $I_a$ flowing in the electrode negative direction, as shown in the first portion of the current graph in the center of FIG. 2, the voltage across capacitor 210 is illustrated as the area 250. When the current is to be shifted from the electrode negative condition to the electrode positive condition during the positive half cycle of voltage $V_{24}$, transistors S3 and S4 are switched on. Consequently, capacitor 210 is charged through resistor 224 by the positive half cycle of voltage $V_{24}$. This high voltage may or may not cause ignition of an arc. At the time illustrated by arrow 112a, a high frequency pulse or series of pulses is created by generator 110 by way of a signal in lead 112 from microprocessor 100. At this time, the capacitor 210 is positively discharged across gap a which is illustrated at position 252 on the capacitor voltage graph. When the arc current is to be shifted from the electrode positive condition A4 V40 to the electrode negative condition, SCRs S1, S2 are gated as shown in the current graph or curve of FIG. 2. This reversal normally causes a quite rapid reversal of current into the electrode negative direction. If that does not occur, capacitor 210 charges in the reverse direction as shown in the lower portion of FIG. 2. In this direction, it is not necessary to use the high frequency arc ignition pulse; however, such pulse may be employed if desired. Capacitor 210 is primarily employed for creating a positive arc reignition condition when shifting from electrode negative to an electrode positive. This is especially applicable when welding aluminum, aluminum alloys and similar metals. The exact time a high frequency pulse is applied is delayed after the current reversal switching has occurred. This delay is controlled by microprocessor 100. In accordance with an optional aspect of the present invention, the amount of delay is correlated with the output welding current of welder A. Such correlation is accomplished by the microprocessor 100 and is schematically illustrated in FIG. 3. In this figure, the delay after current reversal switching is approximately 1.5 milliseconds at a welding current approaching zero. This delay is reduced gradually to approximately 0.3 milliseconds at approximately 125 amperes for the output welding current. Thereafter, the delay in the high frequency pulse or pulses remains constant. The illustrated embodiment is for a welder which has a squaring current of approximately 75 amperes. The squaring current is determined by the size of choke 42. Of course, the delay feature for a pulse in line 112 is optional and may be adjusted according to the desires of either the manufacturer or user of A.C. TIG welder A.

In practice, a relay 300 is incorporated into welder A', as shown in FIG. 4. Relay 300 selectively shifts switch 310 between a first condition with circuit 200 disconnected and a second condition with circuit 200 connected and operating as previously described. When the welder has an open circuit condition, stabilizing circuit 200 is disconnected. Thus, switch 310 is off during open circuit conditions. In addition, the switch 310, in practice, is opened at conditions below the squaring current. In that situation, the concept illustrated in FIG. 3 is not employed.

Before employing the present invention, at the gating of SCRs S3, S4, the arc current decreases and changes somewhat linearly from the electrode negative direction to the electrode positive direction at a rate determined by the choke current level at the time of such gating. In addition, the inductances within the system itself affect the rate of actual current reversal. There is a brief period where the squaring choke 42 is shorted by all SCRs until the negative SCRs S1, S2 are commutated off. The output voltage will reverse almost immediately because the voltage across the bridge 40 is approximately zero. The choke 42 will remain shorted and the bridge will freewheel until the negative SCRs have been commutated off. The output voltage will stay relatively high until this commutation occurs to, thus, stop freewheeling. Then the output voltage will decrease to typical arc voltage levels. By incorporating the present invention, when the bridge is switched from electrode negative to electrode positive, capacitor 210 is immediately reversed biased because it has been charged to the arc voltage, approximately 5–10 volts, in the electrode negative direction as illustrated by line 250 in FIG. 2. Capacitor 210 immediately begins accepting charge from choke 42 through diode 222. This current flow maintains choke 42 current level high while the bridge is shorted. Diode 222 allows rapid charging of capacitor 210 through the charging portion of circuit 220. This provides a voltage reversal for capacitor 210 as shown in the lower graph of FIG. 2. Current is allowed to flow from bridge 40 through capacitor 210 which is a charging current for capacitor 210. The capacitor provides the current path to immediately commutate the negative SCRs to an off condition. Since the voltage of the capacitor increases exponentially, the output voltage will also exponentially increase until arc reignition occurs. This will occur by itself in many instances; however, by using the high frequency pulse from generator 110, the high frequency pulse determines exactly when the current reversal occurs by discharging capacitor 210 across the arc. Consequently, a relatively less intense high frequency pulse can be judicially timed and used to help reignition of the arc quite rapidly. Once the arc has been reignited, the output voltage collapses and the capacitor delivers its charge to the arc, along with the current from the bridge. This is by discharge of capacitor 210 through resistor 224. By employing the present invention, freewheeling is controlled and a relatively weak high frequency can be employed. If a high frequency does not reignite the arc, capacitor 210 continues to rise to a value which can exceed 200 volts. Such high voltage will rapidly reignite the arc. In the prior art, many high frequency pulses are created during each cycle to assure arc ignition during that cycle. By using the present invention, only a single high frequency pulse is required for most applications. In some instances, a back up high frequency pulse is employed merely as an assurance for discharge of capacitor 210.

Resistor 224 is employed to limit the surge of charge from capacitor 210 when the arc reignites. A large current surge may be audible and is not desirable. A smaller current flow as controlled by resistor 224 reduces the uncomfortable audible sound and produces a smoother output sound for the alternating current welding operation. Resistor 224 has no effect on charging capacitor 210 or upon the arc voltage itself until after reignition of the arc. Thus, capacitor 210 is charged through the diode and discharged through the resistor of circuit 220. Since the SCRs are commutated off quite rapidly, choke 42 is not shorted for a long period of time. Therefore, the current flow through the choke produces a voltage as it changes di/dt in magnitude. Hence, the voltage across the bridge adds to the total voltage to allow for higher output voltage than is otherwise possible. With a shorted choke, the maximum voltage is the output voltage across terminals 30, 32. As previously mentioned, switch 310 switches the present invention off during open circuit welding. It is also used to switch the system off during current levels below the squaring current. Below the squaring current, the arc current falls to zero before each polarity reversal. This collapses the voltage across capacitor 210 so that there is no energy in choke 42 when the SCRs are gated. Without energy in the choke, or in the capacitor, the capacitor voltage must slowly build up through the choke. Consequently, at the lower current, the capacitor could act as an energy drain without any substantial improvement for arc reignition. For that reason, in the preferred embodiment, at currents below squaring, switch 310 is shifted to the off position.

Since capacitor 210 must accept a charge having a high energy, the capacitor is 50.0 microfarads for the 255 ampere welder. The small capacitor 120 merely bypasses the high frequency and, in practice is about 0.20 microfarads and has no ability to store energy to break down the arc gap. Capacitor 210 will be at least 10–20 microfarads for a welder in excess of 200 amperes of maximum output current.

This invention has an additional advantage in that the transformer may be designed with a lower secondary voltage than without circuit 200. This is due to the voltage across choke 42 increasing the load voltage.

Having thus defined the invention, the following is claimed:

1. In an A.C. TIG welder for passing a current across an arc gap between a workpiece and a non-consumable electrode alternately between a first direction of an arc current flow with the electrode negative and a second direction of arc current flow with said electrode positive, said welder comprising a transformer with a load voltage creating secondary winding in series with said gap and with a squaring circuit, said squaring circuit comprising a choke a first SCR controlled switching circuit for passing current through said choke in a given flux creating direction when said arc current is passing in said first direction and a second SCR controlled switching circuit for passing current through said choke in said given flux creating direction when said arc current is passing in said second direction, and control means for activating said first switching circuit at a first time when said load voltage is at a first polarity and said second switching circuit at a second time when said load voltage is at a second polarity, the improvement comprising: a current control circuit connected in parallel with said arc gap, said current control circuit having energy storing means, charging means for allowing said energy storing means to be charged rapidly according to the voltage across said arc gap tending to cause current flow across said gap and, discharge means for controlling discharge of said energy storing means across said gap when an arc is created across said gap by current flow whereby said energy storage means being charged and discharged in the same arc current flow direction, said energy storage means discharging across said arc gap a high voltage pulse to form an arc in the absence of said arc across said arc gap.

2. The improvement as defined in claim 1 wherein said charging means is a diode.

3. The improvement as defined in claim 2 wherein said discharge means includes means for controlling the rate of current flow during discharge of said energy storage means across said gap.

4. The improvement as defined in claim 3 wherein said discharge means includes a resistor in series with said energy storage means and said arc gap.

5. The improvement as defined in claim 1 including switch means for selectively disconnecting said current control circuit.

6. The improvement as defined in claim 1 including high frequency means for applying a high frequency, high voltage pulse across said arc gap at a selected third time whereby, in the absence of an arc, said pulse tends to cause discharge of said energy storage means across said gap to cause an arc across said gap.

7. The improvement as defined in claim 5 wherein said third time is correlated with at least said second time when said control means activates said second switching means.

8. The improvement as defined in claim 7 wherein said third time is after said second time.

9. The improvement as defined in claim 7 wherein said third time is delayed from said second time by an amount correlated with the arc current of said welder.

10. The improvement as defined in claim 6 wherein said third time is after said second time.

11. The improvement as defined in claim 6 wherein said third time is delayed from said second time by an amount correlated with the arc current of said welder.

12. The improvement as defined in claim 6 wherein said high frequency means includes means for applying a succession of high frequency pulses across said arc gap whereby each of said pulses, in the absence of an arc, tends to cause discharge of said energy storage means across said gap in said second direction to cause an arc across said gap.

13. The improvement as defined in claim 1 wherein said discharge means includes means for creating a discharge signal at a given time and means for causing said energy storage to discharge upon creation of said signal.

14. The improvement as defined in claim 13 wherein said signal is a pulse of high frequency current.

15. The improvement as defined in claim 1, wherein said energy storage means is a capacitor.

16. The improvement as defined in claim 15 wherein said discharge means includes an inductor in series with said capacitor and said arc gap.

17. The improvement as defined in claim 15 wherein said discharge means includes means for controlling the rate of current flow during discharge of said capacitor across said gap.

18. The improvement as defined in claim 6 wherein said discharge means includes an inductor in series with said capacitor and said arc gap.

19. The improvement as defined in claim 15 wherein said discharge means includes a resistor in series with said capacitor and said arc gap.

20. The improvement as defined in claim 15 wherein said discharge means includes an inductor with said capacitor and said arc gap.

21. The improvement as defined in claim 1, wherein said energy storage means charges and discharges in said second direction.

22. An arc stabilizer circuit for an AC TIG welder for passing alternating current across an arc gap between a workpiece and a non-consumable electrode, said welder including means for squaring said alternating current between a first time where said current changes from electrode positive to electrode negative and a second time where said current changes from electrode negative to electrode positive, said stabilizer includes an energy storing capacitor connected in parallel across said arc gap whereby said energy storing capacitor being charged and discharged in the same arc current flow direction, said energy storing capacitor discharging a high voltage pulse to form an arc across said arc gap when said arc is absent.

23. A circuit as defined in claim 22 including a control circuit with a resistor and diode in parallel and said control circuit being connected in series with said capacitor.

* * * * *